US005888371A

United States Patent [19]
Quate

[11] Patent Number: 5,888,371
[45] Date of Patent: Mar. 30, 1999

[54] METHOD OF FABRICATING AN APERTURE FOR A NEAR FIELD SCANNING OPTICAL MICROSCOPE

[75] Inventor: Calvin F. Quate, Stanford, Calif.

[73] Assignee: The Board of Trustees of the Leland Stanford Jr. University, Stanford, Calif.

[21] Appl. No.: 630,191

[22] Filed: Apr. 10, 1996

[51] Int. Cl.[6] .................................................. C25D 11/02
[52] U.S. Cl. .......................... 205/122; 204/164; 205/118; 205/136
[58] Field of Search ................................... 205/118, 122, 205/124, 136; 204/164

[56] References Cited

U.S. PATENT DOCUMENTS

| 5,240,868 | 8/1993 | Bae et al. | 437/40 |
| 5,354,985 | 10/1994 | Quate | 250/234 |
| 5,517,280 | 5/1996 | Quate | 355/71 |
| 5,618,760 | 4/1997 | Soh et al. | 438/703 |
| 5,641,391 | 6/1997 | Hunter et al. | 205/80 |
| 5,785,838 | 7/1998 | Sugimura et al. | 205/83 |

OTHER PUBLICATIONS

C.B. Prater et al., "Improved Scanning Ion–Conductance Microscope Using Microfabricated Probes", Rev. Sel. Instrum. 62(11), Nov. 1991, 1991 American Institute of Physics, pp. 2634–2638.

Hiroyuki Sugimura et al., "Scanning Probe Anodization: Nanolithography Using Thin Films of Anodically Oxidizable Materials as Resist", Tsukuba Research Laboratory, Nikon Co., 5–9–1 Tokodai, Tsukuba 300–26, Japan. No dates available.

Hiroyuki Sugimura et al., "Tip–Induced Anodization of Titanium Surfaces by Scanning Tunneling Microscopy: A Humidity Effect on Nanolithography", vol. 63, 30 Aug. 1993, No. 9., Appl. Phys. Lett. 63 (9), pp. 1288–1290.

"Scanning Tunneling Microscope Tip–Induced Anodization for Nanofabrication of Titanium", J. Phys. Chem., vol. 98, pp. 4352–4357, Jan. 9, 1994, and Sugimura et al., Appl. Phys. Lett. 63(9), 30 Aug. 1993.

Casillas et al., "STM Fabrication of Platinum Disks of Nanometer Dimensions", J. Electrochem. Soc., vol. 138, No. 2, Feb. 1991, The Electrochemical Society, Inc., pp. 641–642 (1991).

*Primary Examiner*—Kathryn Gorgos
*Assistant Examiner*—William T. Leader
*Attorney, Agent, or Firm*—Skjerven, Morrill, MacPherson, Franklin & Friel; David E. Steuber

[57] ABSTRACT

An extremely small aperture is formed using a sharp conductive tip. The aperture may be in the form of a transparent window or an open aperture. In a first embodiment, the conductive tip is positioned adjacent a layer of titanium and a voltage is applied to the tip. The intense electric field near the tip anodizes the titanium and creates a small transparent window of titanium dioxide. In a second embodiment, a titanium layer is covered with a layer of silicon, a small region of the silicon is oxidized using a conductive tip, and the silicon and then the titanium are etched. In a third embodiment, an electric field from a conductive tip creates a pit in a surface titanium oxide layer. The titanium is then etched, using the oxide layer as a mask, to form an open aperture. The conductive tip is preferably the tip of an atomic force microscope. This process is useful in constructing any instrument, such as a near field optical scanning microscope or a scanning ion conductance microscope, which requires an extremely small, precise aperture.

17 Claims, 5 Drawing Sheets

METHOD OF FABRICATING AN APERTURE FOR A NEAR FIELD SCANNING OPTICAL MICROSCOPE

FIELD OF THE INVENTION

This invention relates to instruments such as near field scanning optical microscopes (NSOMs) and scanning ion conductance microscopes (SICMs) in which a very small transparent or open aperture is required and, in particular, to an aperture for use in an NSOM or SICM and a method of fabricating the aperture.

BACKGROUND OF THE INVENTION

Near field scanning microscopy is a technique for analyzing objects by means of a light beam which is directed through a very small aperture. The aperture can take the form of a window made of a transparent material or an actual opening in an opaque material. The sample to be studied is positioned in the "near field" of the aperture, which begins at the aperture and extends outward a distance equal to about one-half of the width of the aperture, wherein the light emerging from the aperture remains collimated. The width of the aperture must be less than one-half the wavelength ($\lambda$) of the light, and it is frequently made substantially smaller than the wavelength (e.g., $\lambda/20$). During scanning, the aperture must be maintained at a constant distance from the sample.

U.S. Pat. No. 5,354,985 to Quate, which is incorporated herein by reference in its entirety, describes an NSOM in which an optical waveguide is formed along the longitudinal axis of a cantilever. During scanning, the cantilever is positioned parallel to the surface of the sample. A tip is formed near the free end of the cantilever, and the small aperture is formed at the apex of the tip by a focused ion beam process. The cantilever approaches the sample until the apex of the tip is located extremely close to the sample surface. Optical radiation is introduced into the waveguide and transmitted to the tip, where the radiation exits through the aperture.

The tip-sample separation is held constant by operating the cantilever in the manner of an atomic force microscope operating in the non-contact or attractive mode. In this mode of operation, which is well known in the art, the distance between the tip and sample is controlled by detecting the resonant frequency of the cantilever as it is vibrated. A feedback system adjusts the distance between the tip and the sample so as to maintain the resonant frequency at a constant value. The non-contact or attractive mode is described in greater detail in numerous sources, including for example Y. Martin et al., "Atomic Force Microscope Force Mapping And Profiling On A Sub-Hundred Angstrom Scale", Journ. App. Phys., Vol. 6, pp. 4723–4729, March 1987.

If the NSOM is being operated in the transmission mode, the sample is analyzed by detecting the light which passes through the sample; or, if the NSOM is being operated in the reflection mode, the sample is analyzed by detecting the light reflected from the sample.

In an SICM, a very small aperture is formed in a body, typically a pipette, and the body is immersed in an electrolytic bath. An ionic current flows from an electrode located on one side of the body, through the aperture, to one of two electrodes located on the other side of the body in the electrolytic bath.

The resolution obtainable in an NSOM or SICM is a function of the width of the aperture. In an NSOM, for example, the width of the aperture is normally from $\frac{1}{10}$ to $\frac{1}{20}$ of the wavelength of the light being used, or in the range of 15–100 nm. Both the width and thickness of the aperture should be as small as possible. Moreover, for commercial instruments the aperture width and thickness should also be predictable and should be repeatable from one manufacturing batch to another.

SUMMARY OF THE INVENTION

In accordance with this invention, an NSOM or other instrument is provided with an aperture having a width and thickness which are both extremely small and predictable. The aperture can be in the form of a transparent window or a physical opening.

According to one group of embodiments, which are particularly suitable for use with NSOMs, a transparent window aperture is formed by anodizing a metal layer so as to form a small transparent window in the metal layer. The anodization is achieved by applying a voltage to the metal layer using a sharp tip, preferably the tip of an atomic force microscope (AFM). This oxidizes the metal in the region affected by the resulting electric field, forming an oxide of the metal, which is transparent.

In the preferred embodiment of this group, the metal layer is formed of titanium, although in other embodiments other metals such as aluminum, chromium, nickel or iron may be substituted for the titanium.

In the preferred embodiment of an NSOM, the titanium layer is coated onto a pedestal or tip which is formed near the end of a cantilever. The cantilever includes a layer of $Si_3N_4$ which acts as a waveguide for directing the light to the pedestal, where it is emitted through the aperture.

According to another group of embodiments, a very small, predictable open aperture is formed. A metal layer is formed, preferably made of titanium, and a silicon layer is deposited over the metal layer. These processes are carried out in a vacuum to prevent the metal layer from oxidizing. A small area on the surface of the silicon layer is then oxidized with an electric field applied by a small tip, preferably the tip of an AFM. The silicon is then etched, using the surface $SiO_2$ area as a mask, after which the surface of the exposed metal rapidly oxidizes. The silicon underneath the surface $SiO_2$ area is then etched with an etchant which also attacks the metal that is not covered by the metal oxide layer. In this way, a small open aperture is formed in the metal layer.

According to yet another group of embodiments, which are particularly suitable for use with SICMs, a surface layer is formed on a substrate of a material such as a metal or silicon. The surface layer may consist of, for example, an oxide or a nitride of the substrate material. A voltage pulse is applied to the surface layer with a conductive tip, again preferably the tip of an AFM, thereby forming a pit which extends into the surface layer. The substrate is then etched from beneath the pit, yielding an open aperture. In one embodiment in this group, the surface layer is $TiO_2$, which is formed on a titanium substrate.

An aperture formed in accordance with this invention can be used in any instrument or device in which a very small, repeatable aperture is required.

DESCRIPTION OF THE INVENTION

Figure 1:
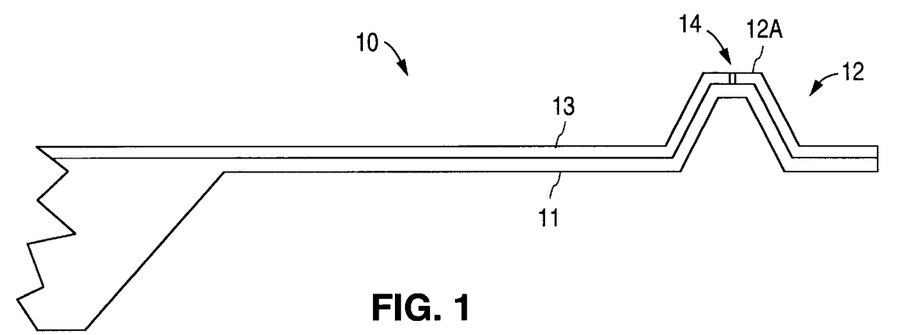
FIG. 1 illustrates a cross-sectional view of a cantilever of an NSOM, including an aperture in accordance with this invention.

FIG. 1 illustrates a cantilever 10 in accordance with this invention which can be used in an NSOM. Cantilever 10 includes a $Si_3N_4$ layer 11 and a titanium layer 13 deposited on the top surface of $Si_3N_4$ layer 11. $Si_3N_4$ layer 11 and titanium layer 13 are formed into a tip or pedestal 12 near the end of cantilever 10. In this embodiment, pedestal 12 is in the form of a truncated pyramid having a flat top surface 12A. A portion of the titanium layer 13 lying on the flat surface 12A has been converted to $TiO_2$, a transparent material, to form a transparent window 14. Light is introduced at the base end of cantilever 10 and travels through the $Si_3N_4$ layer 11, which acts as a waveguide. A portion of this light exits through transparent window 14 and is used to analyze a sample with a near field optical scanning microscope (NSOM) of which cantilever 10 is a part. The manner in which cantilever 10 functions in the NSOM is fully described in the above-referenced U.S. Pat. No. 5,354,985.

Figure 2A:
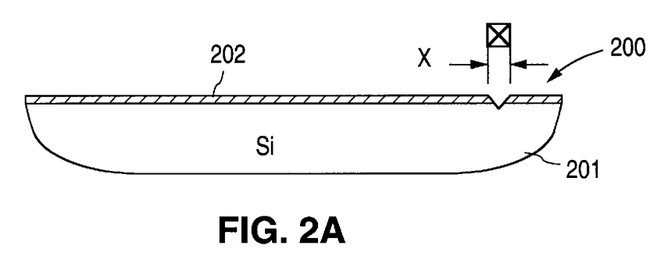
FIGS. 2A–2E illustrate the steps of a process for forming the cantilever.
Figure 2B:
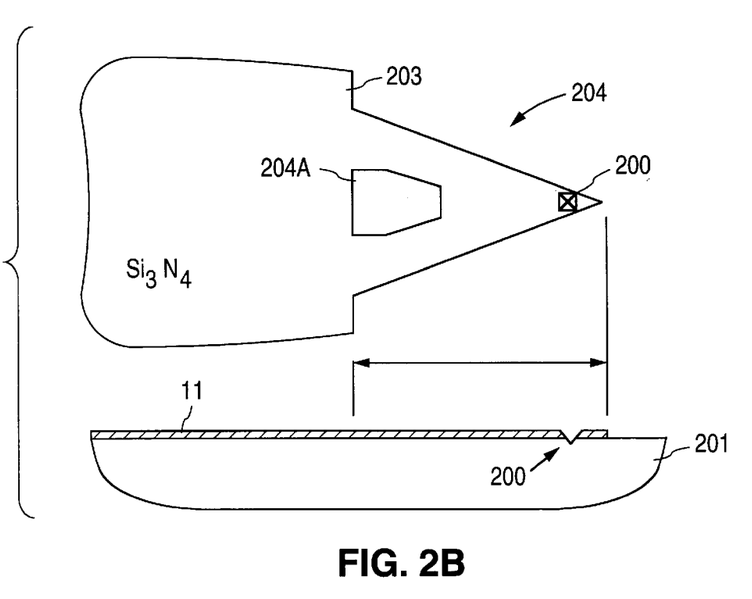
Figure 2C:
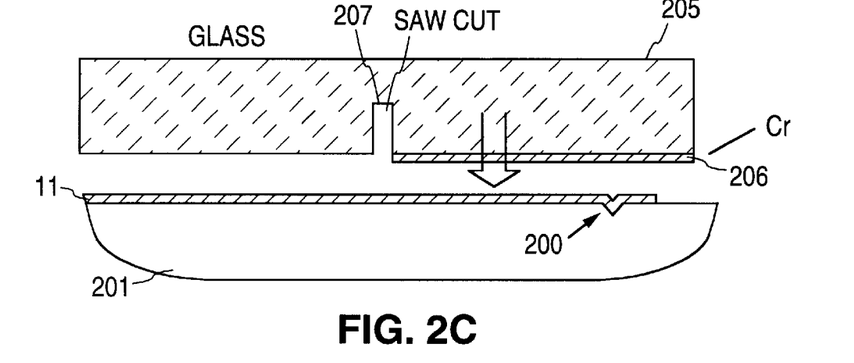
Figure 2D:
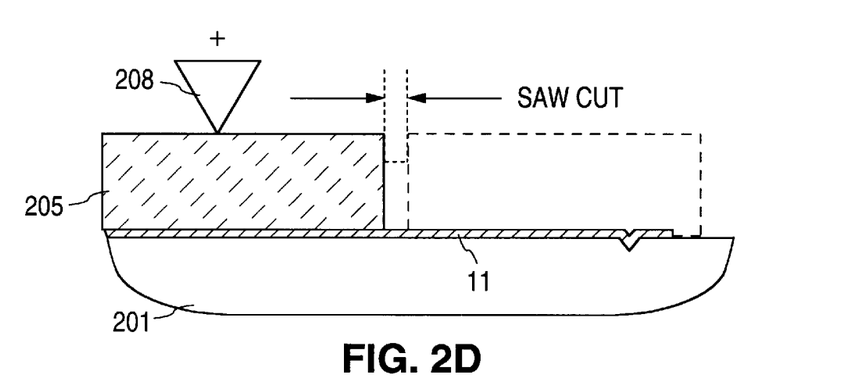
Figure 2E:
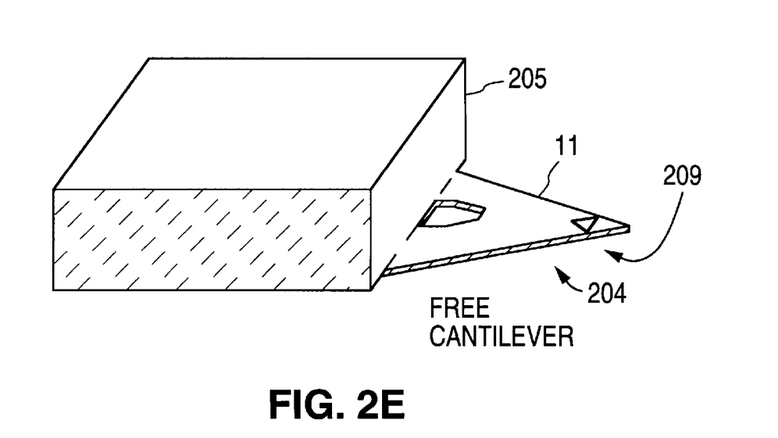
Figure 3A:
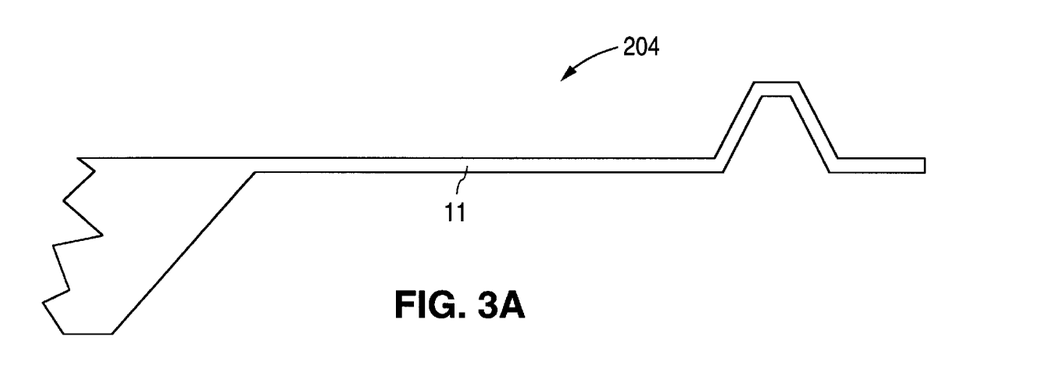
FIGS. 3A and 3B illustrate the steps of a process for forming a transparent window aperture in accordance with this invention.
Figure 3B:
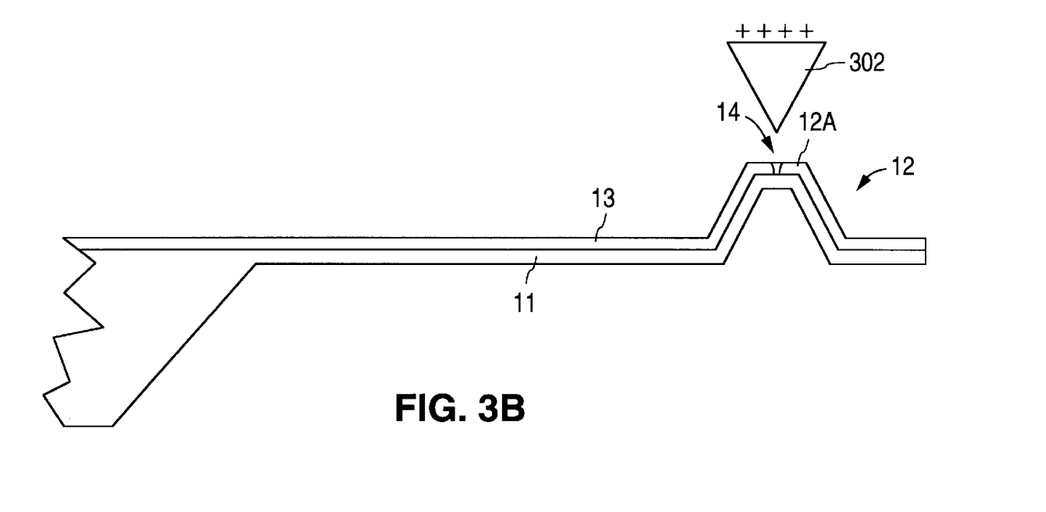

FIGS. 2A–2E illustrate a process which may to used to form cantilever 10, and FIGS. 3A and 3B illustrate the manner of forming transparent window 14.

FIG. 2A shows a pit or recess 200 which is formed on the surface of a (100) silicon wafer 201. To form recess 200, the surface of silicon wafer 201 is masked with a thin film 202 of thermal $SiO_2$, and a small square opening having a side dimension X is etched in film 202. The silicon exposed through the square opening is then etched with an anisotropic etchant such as KOH. This etch process self-terminates at the (111) planes of silicon wafer 201. Terminating the etch process slightly before its natural conclusion produces a recess 200 in the shape of a truncated pyramid, with a flat bottom. After recess 200 has been formed, the $SiO_2$ film 202 is removed from the surface of wafer 201.

As shown in FIG. 2B, $Si_3N_4$ layer 11 is then deposited onto the surface of wafer 201 by sputtering or evaporation. $Si_3N_4$ layer 11 can be from 0.01 to 0.1 $\mu$m thick, for example. Using conventional processes, $Si_3N_4$ layer 11 is then patterned into a cantilever 204, with the recess 200 located near the free end of the cantilever. As shown in the top view of FIG. 2B, in this embodiment cantilever 204 is pointed and contains an interior opening 204A. Other shapes of cantilevers may be used in other embodiments. $Si_3N_4$ layer 11 follows the contours of recess 200 and thus has the shape of an inverted hollow truncated pyramid. After $Si_3N_4$ layer 11 has been deposited, it is annealed in an oxidation furnace in preparation for the later step of anodic bonding.

Turning to FIG. 2C, a plate 205 of borosilicate glass is bonded to the top surface of the $Si_3N_4$ layer 11. To inhibit bonding in the region of the recess 200, a 1200 Å thick chromium layer 206 is patterned on a portion of the bottom surface of glass plate 205. Then a shallow cut 207 is made with a precision dicing saw along an edge of the chromium layer 206. Saw cut 207 defines where the fixed end of the finished cantilever will be located. In order to anodically bond glass plate 205 to $Si_3N_4$ layer 11, the $Si_3N_4$ layer is first annealed in steam at 1100° C. for 4 hours, and glass plate 205 is thoroughly cleaned with a high temperature $H_2SO_4$/$H_2O_2$ mixture.

As shown in FIG. 2D, a DC voltage of +400 V is applied to glass plate 205 by means of a point contact 208, and the structure is heated to a temperature of 475° C. for 4 hours. Although the bonding front moves across the wafer in minutes, a lengthy bonding time greatly increases the strength of the bond to the point where the $Si_3N_4$/glass bond is stronger than the silicon itself. Another saw cut made from the top side of glass plate 205 intersects with cut 207 and allows the removal of the portion of plate 205 which overlies chromium layer 206. Other metals such as titanium may also be used to inhibit anodic bonding between glass plate 205 and $Si_3N_4$ layer 11.

Silicon substrate 201 is then etched from the bottom of $Si_3N_4$ layer 11, leaving the free cantilever 204 and, in the former location of recess 200, a pedestal 209 formed in the shape of a truncated pyramid.

FIGS. 3A and 3B show a process for forming transparent window 14. FIG. 3A is a detailed cross-sectional view of cantilever 204, which includes $Si_3N_4$ layer 11. In FIG. 3B titanium layer 13 is deposited on a surface of the $Si_3N_4$ layer 11. Titanium layer 13 is preferably deposited by electron beam evaporation or ion beam sputter (IBS) deposition and can be, for example, in the range of 100–1000 Å thick. The equipment used for this process is described in Murakami et al., Proc. SPIE 1742, 614 (1992), which is incorporated herein by reference. At this point in the process, the pedestal 12 having flat surface 12A has been formed.

A fluoroalkylsilane (FAS) monolayer (not shown) is then formed on the surface of titanium layer 13 by rinsing layer 13 for 30 minutes in a methanol solution of 2 wt. % FAS ($CF_3(CF_2)_5CH_2CH_2SiCl_3$). Layer 13 is next rinsed, first in methanol and then in pure water, and is baked in air for 60 minutes at 120° C. FAS molecules chemisorb on the surface native oxide of the titanium layer 13, and form a hydrophobic FAS monolayer.

A positive voltage is then applied to the flat surface 12A of the pedestal 12, preferably using a conductive tip 302 of an atomic force microscope. The voltage is preferably in the range of 5 to 50 V. Tip 302 may actually rest on the layer of native $TiO_2$ which covers pedestal 12, or it may be spaced as far as 10–20 nm, for example, from the flat surface 12A. The intense electric field created at the tip 302 ionizes water molecules in the air surrounding the tip. The ionized oxygen is very reactive and serves to anodically oxidize the titanium in the region of flat surface 12A under tip 302. Since $TiO_2$ is transparent, this creates window 14 (shown in FIG. 1) through which light may pass. Transparent window 14 can have a width (diameter) in the range of 15 nm or less.

The result of this process is the cantilever 10 illustrated in FIG. 1.

Further details on the process of anodically oxidizing titanium are found in Sugimura et al., "Scanning Tunneling Microscope Tip-Induced Anodization For Nanofabrication Of Titanium", J. Phys. Chem., Vol. 98, pp. 4352–4357, Jan. 9, 1994, and Sugimura et al., Appl. Phys. Lett. 63 (9), 30 Aug. 1993, each of which is incorporated herein by reference in its entirety.

In other embodiments, another metal such as aluminum, chromium or iron can be substituted for the titanium in layer 13 and a transparent window can be formed by anodizing the metal using the process described above.

Figure 4A:
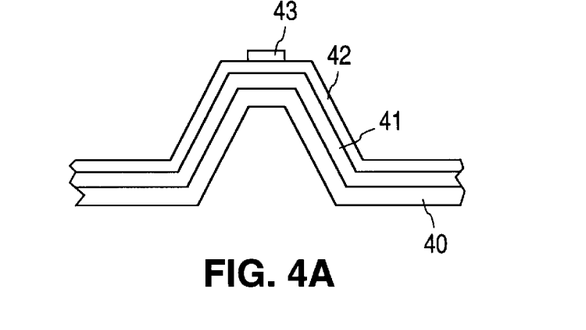
FIGS. 4A–4D illustrate a process for forming an open aperture.
Figure 4B:
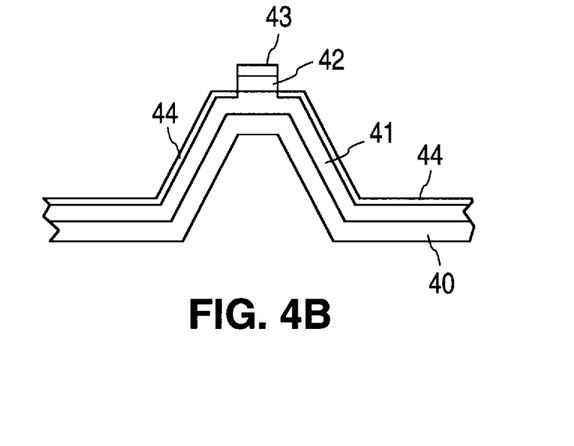
Figure 4C:
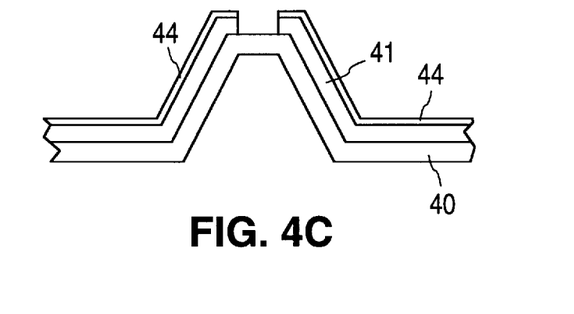

FIGS. 4A–4C illustrate a process which uses SPM tip lithography to form an open aperture rather than a transparent window in a titanium layer.

Referring to FIG. 4A, in the manner described above a layer 41 of titanium is deposited on a $Si_3N_4$ layer 40, which is formed into a pedestal. This is done in a vacuum or oxygen-free environment to prevent the titanium from oxidizing, which it would do very rapidly if exposed to oxygen. A layer 42 of amorphous silicon is immediately deposited on the surface of titanium layer 41. The structure can then be removed from the oxygen-free environment, since amorphous silicon layer 42 will prevent titanium layer 41 from oxidizing. Titanium layer 41 and amorphous silicon layer 42 are preferably deposited using electron-beam evaporation. The top surface of amorphous silicon layer 42 is then exposed with a scanning probe microscope (SPM) tip to form an oxide layer 43.

The use of an SPM tip to form an oxide pattern on the surface of an amorphous silicon layer is described in U.S. Pat. No. 5,618,760 which is incorporated herein by reference.

Next, amorphous silicon layer 42 is etched, using oxide layer 43 as a mask. As shown in FIG. 4B, a $TiO_2$ layer 44 forms on the surface of titanium layer 41 as soon as it is exposed to air.

Referring to FIG. 4C, the structure is then etched in a plasma which attacks both amorphous silicon layer 42 and titanium layer 41, but attacks $TiO_2$ layer 44 much more slowly. This etch is preferably performed in a 1:1 $SF_6$:$CF_3Br$ plasma at 150 mTorr and 0.81 $W/cm^2$. As a result, the amorphous silicon layer 42 and unoxidized titanium beneath it are etched away whereas the oxidized portions of titanium layer 41 remain. The resulting structure is shown in FIG. 4C.

Figure 4D:
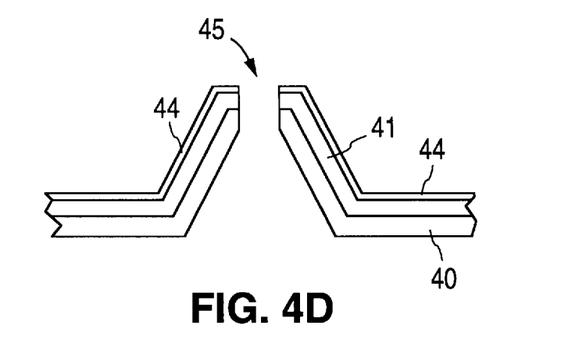

$Si_3N_4$ layer 40 is then etched using RIE at a DC bias of −530 V and a power density of 0.95 $W/cm^2$ or a gas mixture of 14.2:1 Freon 23:$0_2$ at a pressure of 250 mTorr. $TiO_2$ layer 44 and the remaining portion of titanium layer 41 act as a mask. The resulting structure having an open aperture 45 is shown in FIG. 4D.

If $Si_3N_4$ layer 40 were made of silicon, it could be etched with a 1:1 $SF_6$:Freon 115 plasma at 150 mTorr and 0.22 $W/cm^2$. If $Si_3N_4$ layer 40 were made of an organic material, an oxygen plasma etch could be used.

Figure 5:
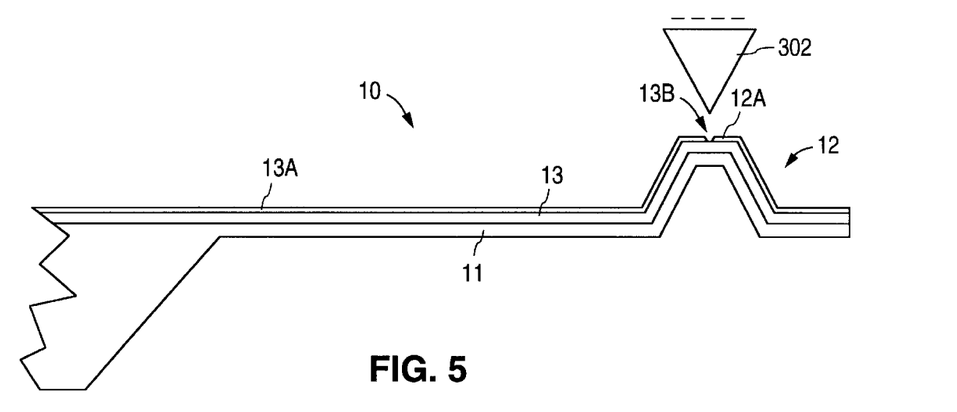
FIG. 5 illustrates an alternative process for forming an open aperture.

Referring to FIG. 5, an alternative method of creating an open aperture in cantilever 10 begins with the formation of a thin $TiO_2$ layer 13A on the surface of titanium layer 13. $TiO_2$ layer 13A can be either native or thermally grown. A voltage pulse is then applied to $TiO_2$ layer 13A using AFM tip 302. This damages $TiO_2$ layer 13A (apparently through electric breakdown) and creates a pit 13B on the surface of pedestal 12 which extends through $TiO_2$ layer 13A. The titanium beneath pit 13B is then etched with HF to produce an open aperture, using $TiO_2$ layer 13A as a mask. Using a voltage pulse of about −5 V for about 0.25 sec creates an aperture 5–40 nm in diameter in an $TiO_2$ layer that is 10 nm thick.

Further details on the above process are given in Casillas et al., J. Electrochem. Soc., 138, pp. 641–2 (1991), which is incorporated herein by reference in its entirety.

A similar process can be applied using other materials, such as a surface layer of $Al_2O_3$ on aluminum or a surface layer of $SiO_2$ or $Si_3N_4$ on silicon. In each case, a voltage pulse is applied to create a pit in the surface layer, and the underlying material is etched away to create an open aperture.

In operation, whether a transparent window or open aperture is formed in the opaque layer which overlies the waveguide, the cantilever is vibrated, and its resonant frequency is detected to maintain a constant separation between the pedestal and the sample which is being examined. In essence, the cantilever is operated in the manner of an atomic force microscope in the noncontact or attractive force mode. The cantilever can be vibrated in several ways. For example, a piezoelectric actuator may be fabricated on a surface of the cantilever and a fluctuating electric signal may be applied to the piezoelectric actuator, causing it to vibrate. Such an arrangement is disclosed in U.S. Pat. No. 5,742,377, issued Apr. 21, 1998. Alternatively, the cantilever may be vibrated by an adjacent capacitive plate, as described in the above-referenced U.S. Pat. No. 5,354,985.

The resonant frequency of the cantilever may be detected by coating the backside of the cantilever with a metal film and reflecting a laser beam against the metal film and towards a photosensitive detector (PSD). Such arrangements are well known in the art, and one such arrangement is described, for example, in U.S. Pat. No. 5,376,790, issued Dec. 27, 1994. In an alternative embodiment, a piezoresistor is constructed in the cantilever, and variations in the resistance of the piezoresistor as the cantilever bends are detected and are used to sense the resonant frequency of the cantilever. In this connection, see the above-referenced U.S. Pat. No. 5,354,985, as well as U.S. Pat. No. 5,345,815, issued Sep. 13, 1994. Other types of deflection detectors known in the art may also be used, for example, those based on electron tunneling, as shown in U.S. Pat. No. Re 33,387; optical interferometry techniques; and capacitive detectors. Each of the above-referenced patents is incorporated herein by reference in its entirety.

While in the embodiments described above the aperture was used in a near field scanning optical microscope, the principles of this invention are applicable to any device in which a very small aperture is required. Another example is the scanning ion conductance microscope (SICM) described in Hansma et al., Science 243, 641 (1989), and Hansma et al., Rev. Sci. Instrum. 62, 2634 (1991), each of which is incorporated herein by reference in its entirety. In a known type of SICM, a glass pipette is filled with an electrolytic solution and immersed in an electrolytic bath. A small aperture is formed at the end of the pipette, and an ionic current flows from an electrode within the pipette through the aperture to one of two electrodes located in the electrolytic bath.

Figure 6:
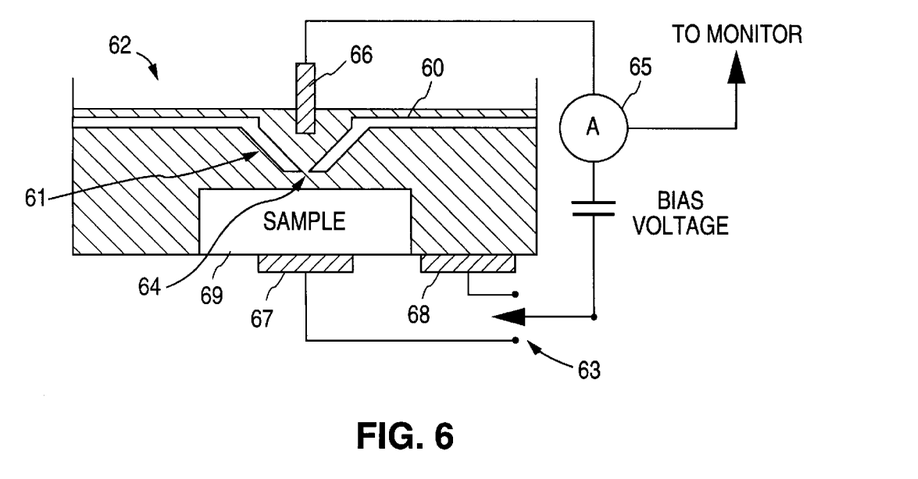
FIG. 6 illustrates a scanning ion conductance microscope in accordance with this invention.

As shown in FIG. 6, in an SICM according to this invention a plate 60 is immersed in an electrolytic bath 62. Plate 60 extends entirely across the bath 62, dividing it into two distinct regions. Plate 60 has a pedestal 61 which is similar to the pedestal 12 in cantilever 10 and an open aperture 64 in pedestal 61. Open aperture 64 is formed in accordance with one of the methods described above. Since plate 60 extends entirely across the bath 62, the only flow path between the respective regions above and below plate 60 is through open aperture 64.

The SICM shown in FIG. 6 also includes an electrode 66 above plate 60 and electrodes 67 and 68 at the bottom of the electrolytic bath 62. Electrode 67 is covered by a sample 69, which could be a membrane, for example. Ionic currents flow from electrode 66 to electrode 67 to image ionic channels or pores in sample 66. An ionic current between electrode 66 and electrode 68 measures the distance between sample 69 and aperture 64, and can be used to image the profile of the sample. A switch 63 is used to select one of electrodes 67 and 68, and an current meter 65 provides a measure of the ionic current.

As described above, open aperture 64 can be formed by etching an amorphous silicon layer, as shown in FIG. 4B, and then etching through an underlying metal layer to form an opening, as shown in FIG. 4C. Alternatively, open aperture 64 can be formed by applying a voltage pulse to create a pit in a surface layer of oxide or other material, as shown in FIG. 3B, and then etching material from beneath the pit to form an opening.

The embodiments described above are illustrative only and are not intended to be limiting. Many alternative embodiments will be apparent to those skilled in the art. The broad principles of this invention are intended to include all such alternative embodiments.

I claim:

1. A method of forming a transparent window in a metal layer, said method comprising:

providing a metal layer;

bringing a conductive tip to a position adjacent said layer; and applying a voltage to said conductive tip to create an electric field between said conductive tip and said layer, said electric field forming an anodized region of said layer, said anodized region extending entirely through a thickness of said layer and forming a transparent window comprising an oxide of said metal.

2. The method of claim 1 wherein said metal layer comprises a metal selected from the group consisting of titanium, aluminum, chromium and iron.

3. The method of claim 1 wherein said metal layer comprises titanium.

4. The method of claim 1 wherein said conductive tip is a tip of an atomic force microscope.

5. A method of fabricating a cantilever for a near field scanning optical microscope comprising:

providing a substrate;

forming a recess in a surface of said substrate;

depositing a layer of a first material capable of functioning as a waveguide on at least a portion of said surface, including said recess, said first material conforming to a shape of said recess so as to form a pedestal;

patterning said layer of said first material;

removing said substrate from at least a portion of said layer of said first material, including said pedestal;

depositing a layer of an opaque material on said pedestal; and applying a voltage to said layer of opaque material, thereby anodizing said layer and forming a transparent window therein, said window being located so as to permit light to escape from said first material in a region of said pedestal.

6. The method of claim 5 wherein said opaque material comprises titanium and said transparent window comprises titanium dioxide.

7. The method of claim 6 comprising forming a fluoro-alkylsilane monolayer on said opaque material.

8. The method of claim 5 wherein said opaque material comprises a metal selected from the group consisting of titanium, aluminum, chromium and iron.

9. The method of claim 5 wherein said pedestal is in the shape of a truncated pyramid.

10. The method of claim 5 wherein said step of applying a voltage comprises applying a voltage using a tip of an atomic force microscope.

11. The method of claim 10 wherein said tip is in contact with said layer of opaque material while said voltage is applied.

12. The method of claim 10 wherein said tip is spaced up to 20 nm from said layer of opaque material while said voltage is applied.

13. The method of claim 5 wherein said first material comprises $Si_3N_4$.

14. The method of claim 13 wherein said substrate comprises silicon.

15. The method of claim 14 wherein forming a recess comprises etching said silicon with an anisotropic etchant.

16. The method of claim 13 comprising bonding a plate of borosilicate glass to said $Si_3N_4$.

17. The method of claim 5 wherein said voltage is in the range of 5 to 50V.

* * * * *

UNITED STATES PATENT AND TRADEMARK OFFICE
CERTIFICATE OF CORRECTION

PATENT NO. : 5,888,371
DATED : March 30, 1999
INVENTOR(S) : Calvin F. Quate

It is certified that error appears in the above-identified patent and that said Letters Patent is hereby corrected as shown below:

At Column 1, line 6; insert the following:

"This invention was made with Government support under contract N00014-91-J-1050 awarded by the Department of the Navy ONR. The Government has certain rights in this invention."

Signed and Sealed this

Seventh Day of September, 1999

Attest:

Q. TODD DICKINSON

Attesting Officer     Acting Commissioner of Patents and Trademarks